July 20, 1965
G. A. MILLER
3,195,769
BURST DIAPHRAGM AND METHOD OF MAKING SAME
Filed Aug. 31, 1961
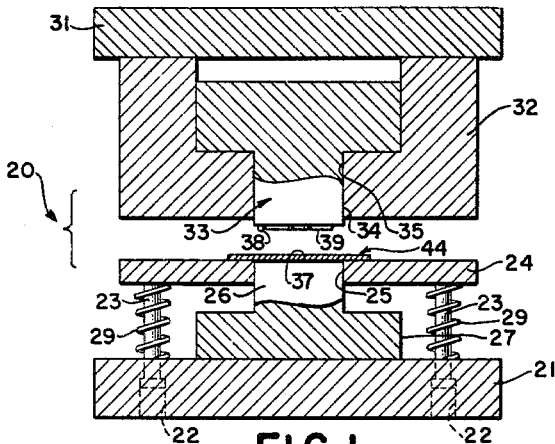
INVENTOR.
Gerald A. Miller
BY
ATTORNEY

United States Patent Office 3,195,769
Patented July 20, 1965

3,195,769
BURST DIAPHRAGM AND METHOD OF MAKING SAME
Gerald A. Miller, 17336 Raymer, Northridge, Calif.
Filed Aug. 31, 1961, Ser. No. 135,376
15 Claims. (Cl. 220—89)

This invention relates to burst diaphragms and more particularly to a high precision frangible diaphragm which will fail at a predetermined pressure with great reliability and to a method of making the same and of securing such a diaphragm in its operating environment without risk of modifying its essential physical properties.

There are many environments where it is important to release a fluid at a desired full flow rate substantially instantaneously upon the application of a predetermined applied load such as a predetermined pressure differential. Frangible or burst diaphragms have been provided for this purpose and a great variety of designs and constructions have been proposed. While many of these have served their intended purpose to a fair degree, they fall far short of meeting the exacting requirements and high tolerance specifications demanded by many present day applications of these devices. Nor are previously proposed manufacturing techniques satisfactory from standpoints of cost, uniformity of the produced product, speed and volume of production, capability of producing a wide range of load supporting sizes, and notably their unsuitability for producing diaphragms designed to fail with reliability at a specified low load, as for example 25 p.s.i.

Various expedients have been resorted to heretofore to obtain diaphragms having thin sections including such expedients as stretching the central area of the diaphragm, spinning, stretching, or doming, or by drawing or punching the center with a rounded tool or by grooving or scoring, milling, failure lines along the diaphragm surface, but each of these techniques has fallen far short of achieving the results desired.

One of the fundamental reasons for these failures is that suitable diaphragm have materials of an ultimate strength which varies over a considerable range. Thus it is well known that the ultimate strength of consecutive pieces of material produced under the most nearly identical conditions possible varies over a wide range. For example, the minimum range variation in the ultimate strength of a particular aluminum alloy under presently known manufacturing practices would be 75,000 to 100,000 p.s.i. Accordingly, if consecutive pieces of such material were provided with identical fracture sections, such diaphragms would fail at widely varying and unpredictable loads including both the upper and lower ultimate strength values of the material present in the failure section. Accordingly, heretofore designers in this field have felt that this inherent characteristic of materials posed an insurmountable obstacle making it impossible to design a diaphragm to any closer tolerance specifications except by finding more precise methods of making the constituent material to more exacting specifications.

The present invention provides a burst diaphragm and a technique for making the product completely avoiding the foregoing and other limitations using currently available materials. This is accomplished in major part by work hardening the stock concurrently with the coining or cold extrusion of the stock to produce thin-walled failure sections. The failure section desirably is work hardened to the point where its ultimate strength lies between the desired narrow range values desired in the installed product. For example, if the aluminum alloy stock referred to previously is work hardened to a pronounced degree, it will have an ultimate strength range lying between 99,000 and 100,000 p.s.i., or 1/25th the variation characteristic of non-work hardened portions of the parent material. It will therefore be recognized that burst diaphragms having thin, work-hardened failure sections of such narrow range ultimate strengths can be relied upon to fail at precise applied loads.

Another feature of this invention is the fact that the main body of the diaphragm can be made as thick as is desirable or necessary to provide the necessary strength, as well as for the purpose of providing a hinge section which is sufficiently strong to retain with certainty the fracture components following failure of the diaphragm. Heretofore this has been a serious shortcoming of diaphragms because the thinness requisite for the proper functioning of the diaphragm provided insufficient assurance that the diaphragm parts would not be completely torn away by the escaping high pressure fluids immediately following fracture.

A preferred method of making the diaphragm comprises a coining or cold extrusion technique by which a blank of flat stock is subjected to rapidly applied high pressure between mold parts at least one of which has ridges for forming the fracture groove projecting therefrom and the height of which is precisely determined relative to the thickness of the stock. Upon closure of the mold parts toward one another, fracture grooves are formed having a thin film-like work-hardened bottoms of the desired thickness, as for example one mil. In this coining operation, the main body of the stock is increased in thickness by reason of the displacement of metal by the ridges as these are coined into the stock, work hardening it in the process, and especially the film-like bottom portions of the groove. All other portions of the stock are displaced only slightly, if at all, and remain substantially in their original condition of hardness. In other words, substantially all work-hardening occurs in the immediate vicinity of the groove and is particularly pronounced as respects the bottom portion of the groove. Work hardening there is so pronounced that the bottom material is brittle and fails substantially instantly upon flexure under high load.

Desirably, one of the fracture grooves extends transversely of the center section of the disk where the disk is highly sensitive to flexure in response to the applied load. Accordingly, as the tension load acting in the diaphragm reaches a critical value, the center of the disk flexes causing the transverse groove to fail, an action which is followed substantially instantly by failure of the arcuate grooves opposite the ends of the transverse groove.

In a preferred arrangement, the transverse groove terminates very close to, but short of merger with, the midportions of the arcuate grooves. In consequence, the diaphragm fractures into two principal components each of which remains firmly attached to the continuous rim of the diaphragm by an associated hinge. This arrangement contributes importantly to the fast action and substantially instantaneous opening of the diaphragm without risk of loss of the fracture components.

Another important feature of the invention is the provision made for welding the finished product into its operating environment without altering objectionably the failure characteristics of the work-hardened areas of the diaphragm. This has been found to present a particularly serious problem heretofore because the temperatures required to fuse the diaphragm to a supporting member, as by brazing or welding, have been found to temper or anneal the work-hardeend areas destroying the accuracy and intended critical failure characteristics. This invariably results in unpredictable and premature failure at an applied load far below the intended design load. These intolerable consequences are avoided in this invention by the controlled artificial cooling of work-hardened areas of the disk to a temperature below that found to alter objectionably the strength characteristics of the failure sections. Further assurance of this result is obtained by forming the disk as a shallow cup having a flanged lip by which the disk can be fused to supporting structure while the bottom and side walls are maintained cooled below the critical temperatures.

In view of the foregoing considerations and other shortcomings characteristic of prior burst diaphragms, it is a primary object of the present invention to provide an improved burst diaphragm, a method of making the same, and a method of assembling a burst diaphragm in an operating environment without affecting its performance characteristics objectionably.

Another object of the invention is the provision of a burst diaphragm having failure areas which have been work-hardened to an extent providing the desired narrow-range ultimate strength characteristics.

Another object of the invention is the provision of a high precision burst diaphragm featuring a plurality of elongated failure sections of film-like thickness work-hardened to a desired degree.

Another object of the invention is the provision of a burst diaphragm having at least one failure groove extending transversely of the center portion and having a work-hardened bottom so related to mutually cooperating failure grooves extending arcuately along the outer rim portion of the diaphragm and with ungrooved hinge sections of the diaphragm as to provide for the failure of the diaphragm across its center and the opening of the fracture sections outwardly about hinge sections.

Another object of the invention is the provision of a cup-shaped burst diaphragm having work-hardened failure grooves in its bottom and an outturned peripheral rim by which the diaphragm can be fuse-connected within its operating environment without risk of altering the failure characteristics of the diaphragm by the annealing action of the fusing temperatures.

Another object of the invention is the provision of a method of forming burst diaphragms by a coining operation to form failure grooves having bottoms which are work-hardened and of filmlike thickness.

Another object of the invention is the provision of a method of forming a burst diaphragm having a main body of any desired thickness and failure sections having an ultimate strength tolerance range which is relatively narrow in comparison with that of the ultimate strength of the tolerance range of the main body of the diaphragm.

Another object of the invention is the provision of a method of forming burst diaphragms from a blank of predetermined dimensions by subjecting the blank to cold extrusion between accurately dimensioned die members cooperating to decrease the thickness of certain sections drastically while work-hardening these sections and simultaneously increasing the thickness of other sections.

Another object of the invention is the provision of a method of assembly of a burst diaphragm having work-hardened areas to a supporting member by a fusing operation while cooling the diaphragm to prevent annealing the work-hardened portions.

These and other more specific objects will appear upon reading the following specification and claims and upon considering in connection therewith the attached drawings to which they relate.

Referring now to the drawing in which a preferred embodiment of the invention is illustrated:

FIGURE 1 is a generally vertical sectional view through the essential components of a suitable progressive type die assembly desirably used in making the invention diaphragm, the die parts being shown in open position;

FIGURE 2 is a fragmentary sectional view of the die shown in FIGURE 1, the position of the parts being shown as the die approaches its fully closed position;

FIGURE 3 is a perspective view of a burst diaphragm according to the present invention;

FIGURE 4 is a view similar to FIGURE 3 but showing the position of the burst fragments in their fully opened position following failure of the diaphragm;

FIGURE 5 is a magnified fragmentary view through portions of two failure grooves and taken along line 5—5 of FIGURE 3;

FIGURE 6 is a view similar to FIGURE 2 and showing a second preferred embodiment of the diaphragm; and, FIGURE 7 is a vertical sectional view of the diaphragm according to FIGURE 6 in the process of being fused to a supporting member.

Referring more particularly to FIGURES 1 to 5, there is shown one preferred embodiment of a burst diaphragm designated generally 10 and made in accordance with the principles of this invention. As there shown, the diaphragm comprises a circular disk of suitable metal as for example ductile aluminum, aluminum alloy or other metal having suitable strength, coining, and work-hardening characteristics, and of which there are numerous examples well known to persons skilled in this art. Desirably, the thickness of the stock material is greater than that customarily employed in many prior burst diaphragm constructions, a thickness of 40 mils being illustrative of a typical construction.

As best appears from FIGURE 3, diaphragm 10 is coined in a manner to be desribed prsently to provide a plurality of arcuate failure grooves 11 arranged circumferentially of rim portions of the disk with their ends terminating in spaced relation to provide hinge sections 12, 12. Cooperating with the arcuate failure grooves 11 is at least one groove 13 extending transversely of the central portion of the diaphragm with its ends terminating opposite the midportions of grooves 11. Groove 13 may merge with grooves 11 although this is not necessary and requires more costly die constructions. It is also pointed out that the grooves 11 preferably have outturned, short-radius arcuate ends 14 disposed as illustrated and serving to provide hinge sections 12 far less likely to sever as the semi-circular fracture sections 15, 15 open.

Referring more particularly to FIGURES 1 and 2, the progressive type die assembly, designated generally 20, used in making the burst diaphragm will be described. This die assembly comprises a base member 21 adapted to be supported on the platen of a conventional press, not shown. Slidably supported in the shouldered openings 22 of plate 21 by pins 23 is a blanking plate 24. Plate 24 has a central opening 25 surrounding the cylindrical shank 26 of die member 27 having an enlarged lower end supported on base member 21 and urged to the position of rest shown in FIGURE 1 in any suitable manner, as by compression springs 29.

The upper portion of die assembly 20 comprises a plate 31 secured in any suitable manner to a vertically reciprocable portion of the press. Securely attached to plate 31 is a cup-shaped bracket member 32 reciprocally supporting therein a male die member 33 the cylindrical shank 34 of which has a close sliding fit with a bore 35 in the bottom of member 32. It is important that facing end surfaces 37 and 38 of die members 26 and 34, respectively, be accurately parallel to one another particularly in the fully closed position of the die assembly for reasons which will be apparent in the following portions of this specification.

Face 38 of die member 33 is provided with V-shaped male die ridges 39 conforming in configuration and relative disposition to grooves 11, 13 and 14, and having as their purpose the coining of these grooves. The height of these ridges is especially critical as this height is highly important in determining the thickness of the groove bottoms in the finished product. It will be understood that the cross-sectional shape of grooves 11 and 13 may be varied at the option of the designer and may differ from one another in a given diaphragm. As shown in FIGURE 5, the crests of ridges 39 are generally flat to form bottoms 40 of work-hardened material lying in the same plane.

It will be understood that the diameters of shank members 26 and 34 are identical as shown in FIGURES 1 to 5 and that upper member 34 has a sharp cutting rim edge cooperating with the similarly formed upper rim edge of opening 25 in member 24 to blank a disk 10 from a sheet of stock 44 while supported on member 24.

To make a fracture disk with the described progressive die assembly, the operator places a sheet of the stock 44 on plate 24 while the die parts are open as shown in FIGURE 1. The controls for the press on which the die assembly is supported are then operated to close the die. The movement of upper member 34 toward plate 24 blanks a disk of metal from stock 44, the blank then being carried upwardly within bore 35 of the upper die member 32 which acts to prevent radial expansion of the blank during the actual coining operation which follows. As this occurs, the closing movement of the die parts causes member 24 to be moved downwardly compressing spring 29. In this connection it is pointed out that the vertical spacing between member 24 and base 27 of the lower die sub-assembly is greater than the spacing between upper member 31 and the upper surface of die member 33. This is important in order that upper coining die 33 may bottom against the part being coined in the final closing position of the die parts.

Sufficient pressure is applied to the die members to force coining ridges 39 substantially into contact with face 37 of lower die member 26. It is found in practice that if the crests of ridges 39 are flat, it is impossible for all practicable purposes to cut through the blank 10 but instead that a thin film-like section 40 of highly work-hardened material remains. In the coining of the grooves it will be recognized that the material formerly present in the parent stock must be displaced by cold flow and distributed throughout the body of the disk thereby increasing its thickness by a measurable amount, such as 3 or 4 mils in a typical example. This marked cold flow of material in the immediate vicinity of the grooves and particularly adjacent their bottom areas hardens this portion of the disk causing it to become relatively brittle, non-ductile and transforming its ultimate strength to a tolerance variation within a very narrow range such as mentioned above.

Referring now to FIGURES 6 and 7, there is shown a second preferred embodiment of the burst diaphragm designated generally 10' and differing from the first described embodiment essentially in that it is cup-shaped with its outwardly extending peripheral rim 50 lying in a plane parallel to and displaced axially from the bottom of the cup. The bottom area may be provided with fracture grooves 11' and 13' of the same character and formed in the same manner as described above in connection with FIGURES 1 to 5. It will be understood that the progressive die 20' used in blanking and coining disk 10' may be constructed similarly to assembly 20 described above and differing only in the respects made clear by FIGURE 6, it being noted that the diameter of the lower die member 26' is less than that of upper die member 34' by an amount accommodating the wall thickness of the cup-shaped fracture disk.

FIGURE 7 shows disk 10' in the process of being welded or suitably secured to a supporting ring member 60 by a technique forming an important feature of this invention. It will be understood that in the mounting arrangement shown, the diameter of the disk corresponds substantially with that of opening 61 in member 60. The disc is welded or secured as shown in FIGURE 7 as by weld 62. This fuse bonding operation is carried out while the entire bottom area, and desirably the side walls of disk 10' are artificially cooled by means of the heat conducting pressure pads 63, 64 held pressed against the opposite surfaces of the disk in any suitable manner. Members 63 and 64 are suitably cavitated to provide cooling passages 65 for a refrigerant medium, such as refrigerated water, preferably circulated through passages 65 by the aid of supply hoses 66. By reason of this cooling, the diaphragm is fused in place without risk of annealing the work-hardened fracture grooves 11', 13'. Thus it is found that maintaining the temperature of these areas below 600° F. is quite adequate although it will be understood that for particularly critical application, as for example when using aluminum, it will be desirable to maintain the temperature of the center portion of the disk appreciably below this value and not over 300° F. This can be readily accomplished with the described cooling pads by circulating the proper quantity of refrigerant medium at an appropriate low temperature.

It will also be understood that the same technique may be employed in mounting disk 10 in a tube or other operating environment. However, as will be appreciated, it is far more difficult to prevent the transfer of heat in objectionable quantities to the critical groove areas when the disk is flat rather than cupped. If there is a sufficient amount of space available in the installed operating environment, the rim portion of a flat non-cupped disk outwardly of the arcuate grooves 11 may be sufficiently wide to permit adequate cooling. In this event, cup-shaped configuration illustrated in FIGURES 6 and 7 need not be employed. However, it is not always possible to increase the diameter of the disk to provide this additional marginal rim. In such cases, the cupped form shown in FIGURES 6 and 7 is utilized.

The operation of the disk will be quite apparent from the foregoing discussion of typical constructions and their characteristics. When the applied load, whether applied through mechanical means or fluid pressure, loads the thin film-like bottom 40 of groove 13, the center portion of the disk tends to bulge away from the applied load thereby flexing the bottom of this groove and placing it in tension beyond its ultimate strength. Immediately this happens, the two fracture sectors 15, 15 open outwardly away from one another about the axis provided by hinges 12, 12 releasing the load for movement past these members. During the opening movement, the material at the opposite ends of groove 13 severs as does the bottoms of grooves 11, 11, fracture occurring substantially simultaneously but slightly, later than the fracture of groove 13. A slight amount of uncoined material is left between the ends of groove 15 and adjacent portions of groove 11 because this expedient greatly simplifies the machining and shaping of ridges 39 on the face 38 of die member 33. As will be appreciated, it would be extremely painstaking and costly to form the critical surfaces of ridges 39 were these to be integral with one another. They may be integral if desired, but in actual practice it is found unnecessary to so make them with attendant appreciable savings in labor and time.

Although the bottoms 40 of the grooves have been shown and described as lying flush with one face of the burst diaphragm, it is pointed out that this disposition is not essential and that these critical surfaces may be located at any point intermediate the two surfaces of the disk if this is found advantageous. This is accomplished by providing coining ridges 39 of appropriate heights on each of faces 37 and 38 of the two die members. Such a practice greatly increases the cost of forming the dies but this disadvantage may be offset by favorable and different operating characteristics of the resulting product.

While the particular burst diaphragm and method of making and assembling the same in its operating environment as shown and disclosed in detail hereinabove are fully capable of attaining the objects and providing the advantages hereinabove stated, it is to be understood that they are merely illustrative of the presently preferred embodiments of the invention and that no limitations are intended in the details of construction or design herein shown other than as defined in the appended claims.

I claim:

1. An article of manufacture comprising a one-piece imperforate burst diaphragm of essentially ductile metal having a plurality of independent nonintersecting failure grooves each having a thin narrow flat bottom lying in the plane of the face of the diaphragm and which groove bottoms are hard and brittle in comparison with the ductile character of substantially all other portions of the diaphragm, said failure grooves being distributed in an arc adjacent but spaced inwardly from the perimeter of the diaphragm and including one groove crossing the center of the diaphragm where its bottom is subjected to the greatest stress and fails first when the diaphragm is subjected to a predetermined pressure differential, said failure grooves including a plurality of arcuate grooves arranged in a ring with their ends spaced closely apart circumferentially of the diaphragm to provide a plurality of narrow hinge tabs interconnecting central portions of the diaphragm with perimeter portions thereof lying outside said arcuate grooves, said one groove extending across the central portion of the diaphragm with its ends terminating near but short of the midportion of an associated pair of said arcuate grooves, whereby the central portion of said diaphragm is separable into a plurality of arcuate sectors when said grooves fail with each sector being held captive to the rim portion of the diaphragm by said hinge tabs, and each of said arcuate grooves having terminal ends of materially different and sharper curvatures than the curvature of the midportions of said arcuate grooves.

2. An article as defined in claim 1 characterized in that all of said terminal ends of said arcuate grooves lie on the same radial side of the arcuate grooves.

3. A burst diaphragm adapted to fail and burst in response to a predetermined pressure differential acting on its opposite faces, said diaphragm comprising a thin disk of coinable ductile metal readily deformable in cold flow under high pressure impact and having the property of work-hardening during cold flow and becoming brittle in areas subjected to relatively great cold flow, said ductile disk having a plurality of deep failure grooves with film-thin bottoms of hard brittle metal integral with ductile metal to either side thereof and including arcuate grooves lying along the perimeter portion of said disk in spaced-apart end-to-end relation and at least one straight groove lying across the center of the disk and generally bisecting said arcuate grooves and adapted to fail first as the application of a pressure differential there across bulges the disk and flexes the brittle film-thin bottom of said straight groove.

4. A burst diaphragm as defined in claim 3 characterized in that said disk is dished to provide a large area flat-surfaced central portion connected to the rim portion of said disk by a narrow connecting ring having a narrow flange integral therewith adapted to be heat-bonded to a rigid supporting structure without risk of annealing the tempered hard brittle bottoms of said failure grooves.

5. The combination defined in claim 3 characterized in that the opposite ends of said diametric groove terminate close to the midportions of a pair of arcuate grooves, the ends of said pair of arcuate grooves terminating in circumferentially spaced relation to one another and being curved outwardly toward the rim of said disk thereby to form a connecting hinge tab between the radially opposed sides of said arcuate grooves, said diametric groove cooperating with said pair of arcuate grooves to form a pair of semi-circular sectors lying in a common plane before fracture of said disk, said sectors and the associated hinge tabs being foldable outwardly away from one another upon the failure of said failure grooves and the force of the escaping fluid released thereby being effective to deform said sectors to lie flush against the interior surfaces of the chamber surrounding the low pressure side of said disk.

6. An article of manufacture comprising a high precision burst diaphragm formed in one unitary piece of ductile metal and adapted to fail at a predetermined pressure differential, said unitary piece of ductile metal having a plurality of deep arcuate failure grooves formed inwardly of and closely adjacent the rim portions having short radius curved ends spaced closely apart circumferentially of said diaphragm and another deep failure groove extending transversely of the midportion of the diaphragm and terminating short of but closely adjacent the midlengths of said first mentioned grooves, the bottoms of said grooves being narrow, flat and thin and the metal thereof being integral with the ductile metal of the diaphragm proper but hard, brittle and nonductile and subject to sudden failure lengthwise of said grooves upon flexure thereof.

7. An article of manufacture as defined in claim 6 characterized in that said burst diaphragm is of shallow cup shape with a generally flat bottom, the rim edge of said cup-shaped diaphragm having a mounting flange integral therewith and projecting outwardly and adapted to be heat bonded to a supporting member, and all of said failure grooves being located in said flat bottom and separated from said mounting flange by the side wall portion of said cup-shaped diaphragm.

8. An article of manufacture as defined in claim 7 characterized in that the side wall portion of said cup-shaped diaphragm is relatively short in axial length as compared with the diameter of the bottom of said diaphragm.

9. That improved method of making a burst diaphragm adapted to fail at a predetermined pressure, said method comprising blanking a disk of metal from sheet stock and immediately and as part of the blanking step subjecting the opposite faces of the blank to impact coining between die members in a chamber rigidly supporting the rim edges of the blank, one of said die members having ridges projecting from the face thereof of a height substantially equal to the thickness of the blank disk, whereby the high-pressure high-speed impact closure of said die members against the blanked disk increases the thickness of said confined disk while coining grooves thereinto having thin flat bottoms of brittle work-hardened metal adapted to fail when subjected to a predetermined pressure which pressure is a function of the disk diameter and of the thickness of the groove bottoms, said failure grooves including at least one groove extending transversely of the central portion of the disk and adapted to rupture when flexed as the disk bulges in response to fluid pressure applied thereto.

10. The method defined in claim 9 characterized in the process of forming different burst diaphragms designed to fail at different predetermined failure pressures by regulating conditions under which said grooves are coined into said blank thereby to form grooves having work-hardened bottoms of different thickness having corresponding different failure characteristics and known to fail at corresponding different predetermined pressure conditions.

11. The method of assembling a ductile metal burst diaphragm having failure grooves formed by impact coining to provide groove bottoms of thin frangible work-hardened material subject to failure when flexed in response to the application of pressure and the characteristics of which are adversely affected if subjected to annealing temperatures, said assembly method comprising holding the rim of said diaphragm in welding position with respect to a metal member to which it is to be assembled with the rim areas to be welded accessible to a workman and to hand-held welding tools, said holding being being performed at least in major part by refrigerated holding members in heat-exchange surface contact with the grooved central area of said diaphragm, and progressively welding the rim of said diaphragm to said metal member while restricting the temperature rise of the central area and the work-hardened portions of said diaphragm to a value which does not anneal said work-hardened portions and does not substantially alter the bursting characteristics of said failure grooves.

12. The method defined in claim 11 characterized in the step of circulating a refrigerating medium past and in heat exchange with the grooved areas of said burst diaphragm to maintain these areas cooled to a temperature below which the hardened bottoms of said grooves start to anneal.

13. That method of making a one-piece burst diaphragm adapted to fail with precision at a predetermined pressure, said method comprising blanking a disk from ductile sheet metal and continuing the blanking stroke with die means having high-precision groove-forming ridges on the face thereof, utilizing said blanking stroke to transfer the blanked disk into a confining die cavity and there subjecting said confined disk to suddenly applied impact pressure to cause cold flow of metal in said disk to form a plurality of failure grooves simultaneously in said disk at least one of which grooves extends transversely thereof while increasing the thickness of the main body portion of the disk, and limiting the stroke of said die means in said cold flow operation by the bottoming of the die means against said confined disk of ductile metal to provide a failure disk composed principally of ductile metal and failure grooves having flat thin bottoms of brittle work-hardened metal integral with the ductile main body metal to either side thereof and which thin bottoms are converted into hard brittle condition by rapidly occurring cold flow of metal in the immediate vicinity of said failure grooves during the formation thereof by said rapidly applied high impact pressure.

14. That method defined in claim 13 characterized in the step of deforming said blank metal disk into a shallow cup with a generally radially flanged rim adapted to be heat bonded at its outer peripheral edge to a supporting member for said burst diaphragm.

15. That method defined in claim 14 characterized in that the deformation of said disk into shallow cup formation is performed generally concurrently with the formation of said failure grooves and as said die means are moved toward one another.

References Cited by the Examiner
UNITED STATES PATENTS

| | | | |
|---|---|---|---|
| 1,019,919 | 3/12 | Richer | 29—412 |
| 1,128,532 | 2/15 | Schmidt | 29—432 |
| 1,413,907 | 4/22 | Gerstenberger. | |
| 1,558,419 | 10/25 | White | 29/418 |
| 1,969,840 | 8/34 | Goddard | 29—487 X |
| 2,553,267 | 5/51 | Nedoh | 29—418 |
| 2,576,431 | 11/51 | White. | |
| 2,663,458 | 12/53 | MacGlashon. | |
| 2,768,595 | 10/56 | Kalbow et al. | 29—487 |
| 2,862,294 | 12/58 | Philip | 29—487 |
| 2,889,070 | 6/59 | Coffman | 220—89 |
| 2,915,217 | 12/59 | Coffman | 220—89 |
| 2,934,813 | 5/60 | Nippert | 29—155.5 |
| 2,986,811 | 6/61 | Rudd | 29—487 |
| 3,005,573 | 10/61 | Dawson et al. | 220—89 |
| 3,029,987 | 4/62 | Gronemeyer. | |
| 3,039,482 | 6/62 | Goldbert | 220—89 X |
| 3,050,849 | 8/62 | Etchison et al. | 29—534 |

FOREIGN PATENTS 748,953  5/56  Great Britain.

THERON E. CONDON, *Primary Examiner*.

EMILE PAUL, EARLE J. DRUMMOND, GEORGE O. RALSTON, *Examiners*.